United States Patent [19]
Hudson

[11] Patent Number: 5,925,140
[45] Date of Patent: Jul. 20, 1999

[54] APPARATUS AND METHOD FOR ERROR FREE LOADING OF A PROGRAMMABLE NON-VOLATILE MEMORY OVER A DATALINK

[75] Inventor: Michael D. Hudson, Portland, Oreg.

[73] Assignee: Intel Corporation, Santa Clara, Calif.

[21] Appl. No.: 08/899,447

[22] Filed: Jul. 23, 1997

Related U.S. Application Data

[63] Continuation of application No. 08/512,961, Aug. 9, 1995, abandoned, which is a continuation of application No. 08/056,427, Apr. 30, 1993.

[51] Int. Cl.⁶ .................................................. G06F 11/34
[52] U.S. Cl. .......................... 714/52; 714/712; 714/752
[58] Field of Search ........................ 395/185.01, 185.02, 395/185.05; 371/20.1, 37.01, 48

[56] References Cited

U.S. PATENT DOCUMENTS 4,754,482  6/1988  Weiss ........................................ 380/48
4,831,624  5/1989  McLaughlin et al. .................... 371/37

*Primary Examiner*—Phung M. Chung
*Attorney, Agent, or Firm*—Blakely, Sokoloff, Taylor & Zafman

[57] ABSTRACT

An apparatus and method for error free loading of a programmable non-volatile memory device over a serial or parallel data link. The apparatus comprises a host system connected to a unit to be programmed via a data communications link. The host system comprises a central processing unit (CPU) coupled to random access memory (RAM) via a bus, and the unit to be programmed represents a device in which a programmable non-volatile memory is installed. The data to be stored in the programmable non-volatile memory is sent by the host system in data packets to allow error checking to be applied to each block transmitted across the data communications link to the unit to be programmed. The host system builds data blocks in frames, computes an error detection code, and sends the frames containing the data and the error detection code across the data link to the unit to be programmed. The unit to be programmed uses the error detection code to determine if the transmission was successful. If the transfer was error free, the data is loaded into the programmable non-volatile memory in the unit to be programmed. If the frame was received in error, the unit to be programmed sends a frame back to the host system notifying it that the transmission contained an error. This process of sending and acknowledging frames continues until the programmable non-volatile memory in the unit to be programmed is completely programmed.

27 Claims, 15 Drawing Sheets

APPARATUS AND METHOD FOR ERROR FREE LOADING OF A PROGRAMMABLE NON-VOLATILE MEMORY OVER A DATALINK

This is a continuaton of application Ser. No. 08/512,961, filed Aug. 9, 1995, now abandoned, which is a continuation of application Ser. No. 08/056,427, filed Apr. 30, 1993.

BACKGROUND OF THE INVENTION

1. Field of the Invention

The present invention relates to the field of computer systems. Specifically, the present invention relates to the field of computer system architectures incorporating a programmable non-volatile form of basic operating system processing logic.

2. Description of Related Art

Prior art computer systems are typically boot strapped (i.e. power-up initialized) using the processing logic (i.e. firmware) stored within the read-only memory device (ROM) which is internal to the computer system. Because the read-only memory device is non-volatile (yet not dynamically programmable), the firmware within ROM is guaranteed to contain valid data or instructions. Thus, the prior art computer system can be reliably boot- strapped after power-up after using firmware within ROM. Many computer systems having successfully used this technique. One such system is the IBM Personal Computer (PC) developed by the IBM Corporation of Armonk, N.Y. Prior art versions of the IBM PC use read-only memory devices for storage of firmware or a basic input/output operating system (BIOS) software program. The BIOS is operating system processing logic that provides the lowest level of software control over the hardware and resources of the computer system. ROM storage may also be used for non-programmable non-volatile retention of network configuration data or applications specific data. ROM devices in the prior art include conventional read-only memory devices (ROM), programmable read-only memory devices (PROM), and erasable programmable read-only memory devices (EPROM).

Although ROM based computer systems have been very successful in the prior art, a number of problems exist with the use of non-dynamically programmable non-volatile memory devices in these computer systems. Read-only memory devices must be programmed with a BIOS and/or data prior to being placed into the system during production and assembly of the computer system. Often, the BIOS ROM is installed on a system circuit board within the computer housing. In order to replace, modify, or update firmware in a ROM based computer system, the computer housing must be removed and ROM devices on a system circuit board internal to the computer system must be disconnected and replaced or reprogrammed. This invasive ROM replacement and reprogramming procedure is disadvantageous for a number of reasons. First, the ROM replacement operation typically must be performed manually by qualified field service or computer repair personnel; thus, the operation tends to be expensive and time consuming. Secondly, even qualified technical service personnel may introduce problems during the ROM replacement operation. If solder connections are necessary, existing connections may be damaged or weakened in the process. Also, electrostatic discharge may inadvertently cause damage to other components on the circuit board during the ROM replacement operation. Thirdly, ROM based computer systems are not easily customized for specific applications. Such customization includes modifications for operation in non-English speaking countries. In order to customize a computer system by storing language specific data in non-volatile memory, a user must program and install a read-only memory device on a circuit board in the computer system. Because of the inconvenient ROM installation procedure in the prior art, a user is unable or less likely to customize his/her computer system. Moreover, the manufacture of computer systems is complicated if an application specific ROM must be installed using a hardware installation procedure.

A dynamic non-volatile memory update apparatus and method is described in a co-pending U.S. patent application Ser. No. 07/695,952, filed May 6, 1991 entitled "Dynamic Non-Volatile Memory Update in a Computer System". The referenced patent application describes a computer system and method wherein a portion of the non-volatile memory may be modified or updated without removal of system hardware components. This system uses a form of non-volatile memory known as flash memory. Flash memory provides a dynamically programmable non-volatile form of memory that is not destroyed when power is removed from the computer system; however, the contents of flash memory may be erased and dynamically reprogrammed without removing the flash memory device from the circuit. Flash memory devices are well known in the art. One such flash memory device is a 28F001BT flash memory device which is a 1M bit memory device manufactured by Intel Corporation of Santa Clara, Calif. It will be apparent to those of ordinary skill in the art that other forms of reprogrammable non-volatile memory devices may be used.

Conventional computer systems provide a means for dynamically reprogramming a non-volatile memory device installed within the system itself. In this configuration, error free loading of the non-volatile memory device is assured using signals internal to the computer system. However, it is advantageous to connect an external host system to a unit to be programmed containing a non-volatile memory device. The host system can then be used to program or reprogram the non-volatile memory on the unit containing the non-volatile memory. For example, a non-volatile memory device containing a BIOS may be installed on a function board such as a modem or network interface board. A host system may be connected to such a board using a serial or parallel data communications link. The host system may then be used to program or reprogram the BIOS contained within the non-volatile memory device. It is critical however that the programming of the contents of the non-volatile memory device is performed in an error free manner. Conventional systems risk errors induced by serial or parallel transmission of the code or data to be installed in the non-volatile memory device.

Thus, a better apparatus and method for dynamic error-free loading of a non-volatile memory device is required.

SUMMARY OF THE INVENTION

The present invention is an apparatus and method for error free loading of a programmable non-volatile memory device over a data link. This apparatus comprises a host system connected a unit to be programmed via a data communications link. The host system comprises a central processing unit (CPU) coupled to random access memory (RAM) via a bus. The unit to be programmed represents a device in which a programmable non-volatile memory is installed. Such devices include personal computers, modem boards, network interface boards, multi media application boards, applications specific hardware, or other units having a re-programmable form of non-volatile memory installed therein.

In the present invention, the data to be stored in the programmable non-volatile memory is sent by the host system in data packets to allow error checking to be applied to each block transmitted across the data communications link to the unit to be programmed. The host system builds data blocks in frames, computes an error detection code, and sends the frames containing the data and the error detection code across the data link to the unit to be programmed. The unit to be programmed uses the error detection code to determine if the transmission was successful. If the transfer was error free, the data is loaded into the programmable non-volatile memory in the unit to be programmed. If the frame was received in error, the unit to be programmed sends a frame back to the host system notifying it that the transmission contained an error. This process of sending and acknowledging frames continues until the programmable non-volatile memory in the unit to be programmed is completely programmed.

It is therefore an advantage of the present invention that loading of a non-volatile memory device may be performed while assuring an error free load. It is a further advantage of the present invention in that a host system may be linked to a unit containing a non-volatile memory device via a serial or parallel data communications link. It is a further advantage of the present invention that the transfer of information from a host system to a unit being programmed may be performed without loss of information. It is a further advantage of the present invention that the loading of non-volatile memory may be performed without unreasonably delaying the loading process.

These and other objects and advantages of the present invention will become apparent as presented and described in the following detail description of the preferred embodiment.

DETAILED DESCRIPTION OF THE PREFERRED EMBODIMENT

The present invention is an apparatus and method for error free loading of a programmable non-volatile memory device over a data link. In the following description, numerous specific details are set forth in order to provide a thorough understanding of the present invention. However, it will be apparent to one of ordinary skill in the art that these specific details need not be used to practice the present invention. In other instances, well known structures, circuits, and interfaces have not been shown in detail in order not to unnecessarily obscure the present invention.

Figure 1:
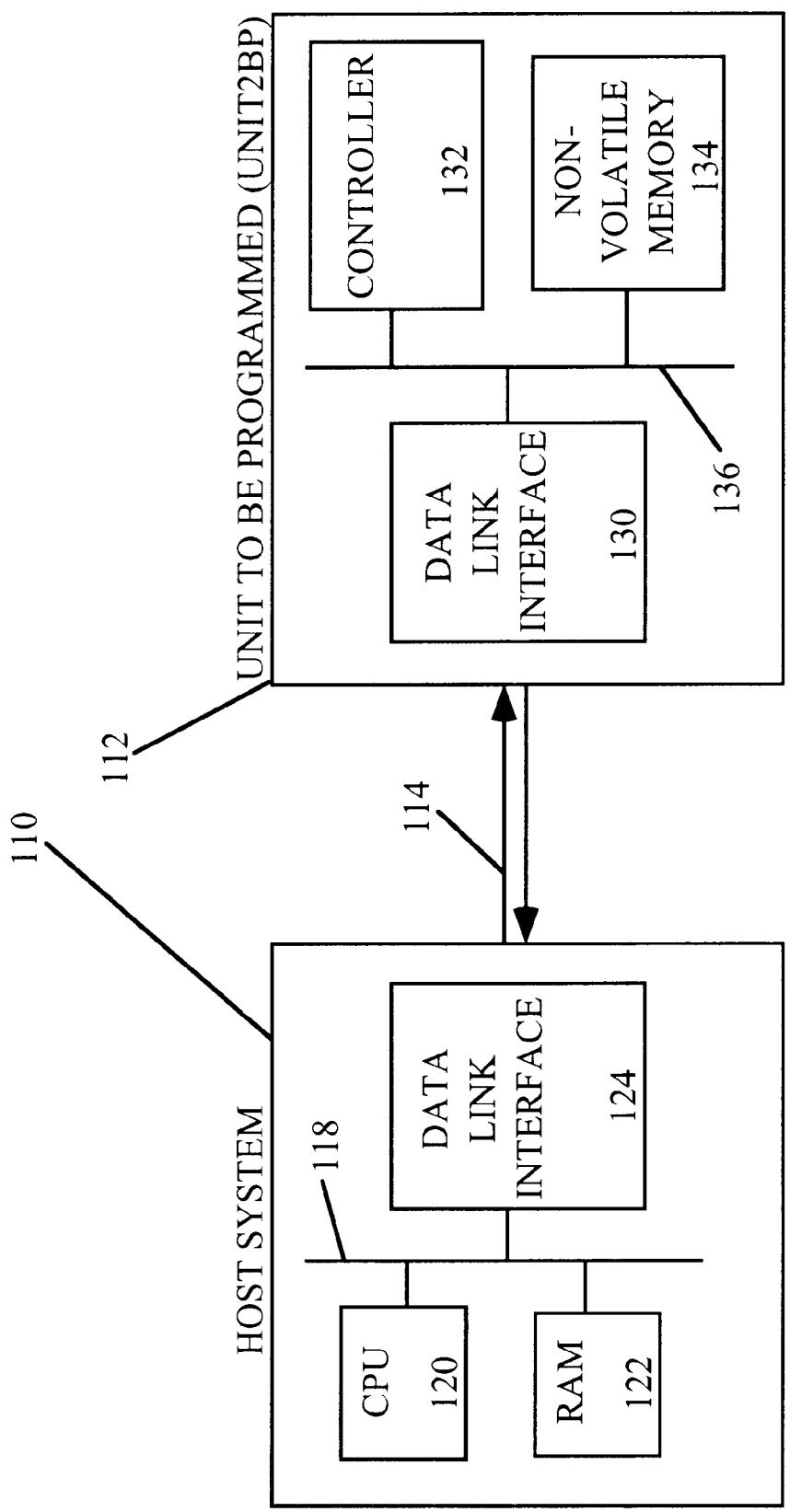
FIG. 1 is an illustration of the hardware components of the present invention.

Referring to FIG. 1, a typical hardware configuration in which the present invention operates is illustrated. This configuration comprises a host system 110 connected a unit to be programmed (denoted UNIT2BP) 112 via data communications link 114. Host system 110 comprises a CPU 120 coupled to random access memory (RAM) 122 via bus 118. CPU 120 is any of a family of microprocessors manufactured by Intel Corporation of Santa Clara, Calif. or other processor developers. RAM 122 is typically a high speed dynamic random access memory which is used for the storage of programmed data and instructions executed by CPU 120. The implementation of a processing system having a CPU and RAM is well known to those of ordinary skill in the art. Similarly, many bus protocols for bus 118 are well known in the art.

Data link interface 124 is coupled to bus 118. Data link interface 124 provides a means for CPU 120 to transmit or receive data via communications link 114. Data communications link 114 can be implemented as either a parallel or serial data communications link as well known in the art. Data link interface 124 receives control signals and data from CPU 120 via bus 118 and converts the data for transmission across data link 114. Similarly, data link interface 124 receives data via data communications link 114 and converts the data for transfer to CPU 120 via bus 118. In addition, data link interface 124 provides a means for block data transfers on link 114. Transferring data blocks across a data communications link in this fashion is well known to those of ordinary skill in the art. In the preferred embodiment, a serial data line communication (SDLC) protocol is used across data link 114. Such a well known protocol is implemented on data link interface 124. It will be apparent to those of ordinary skill in art that other forms of data communications interface protocols may be alternatively used.

The unit to be programmed (UNIT2BP) 112 represents a device in which a programmable non-volatile memory 134 is installed. Such devices include personal computers, modem boards, network interface boards, multi media application boards, applications specific hardware, or other units having a re-programmable form of non-volatile memory installed therein. A UNIT2BP 112 is typically configured with a data link interface 130 for controlling communications over data communications link 114. As described above for data link interface 124, data link interface 130 supports block oriented data transfers across communications link 114. UNIT2BP 112 also includes controller 132 for controlling the operation of unit 112. Controller 132 is any of a family of microprocessors or microcontrollers available from Intel Corporation or other vendors. Data link interface 130 is coupled to controller 132 via bus 136. Unit 112 also includes programmable non-volatile memory 134 which is coupled to bus 136. Programmable non-volatile memory 134 is a re-programmable form of persistent memory known as flash memory in the preferred embodiment. Several different types of flash memory devices exist in the prior art. Using a dedicated set of electrical signals, the contents of flash memory may be erased and re-programmed with new data. Many prior art flash memory devices only allow complete erasure and reprogramming of all memory locations of the device. Other flash memory devices, however are partitioned into separately erasable and programmable blocks of memory in a single flash memory device. In the preferred embodiment of the present invention, such a partitioned flash memory device is used. In the preferred embodiment, a flash memory device denoted 28F001BT is used. The 28F001BT flash memory is a 1M bit memory device manufactured by Intel Corporation of Santa Clara, Calif. It will be apparent to those of ordinary skill in the art that other forms of re-programmable non-volatile memory devices may be used with the invention taught herein.

Figure 1A:
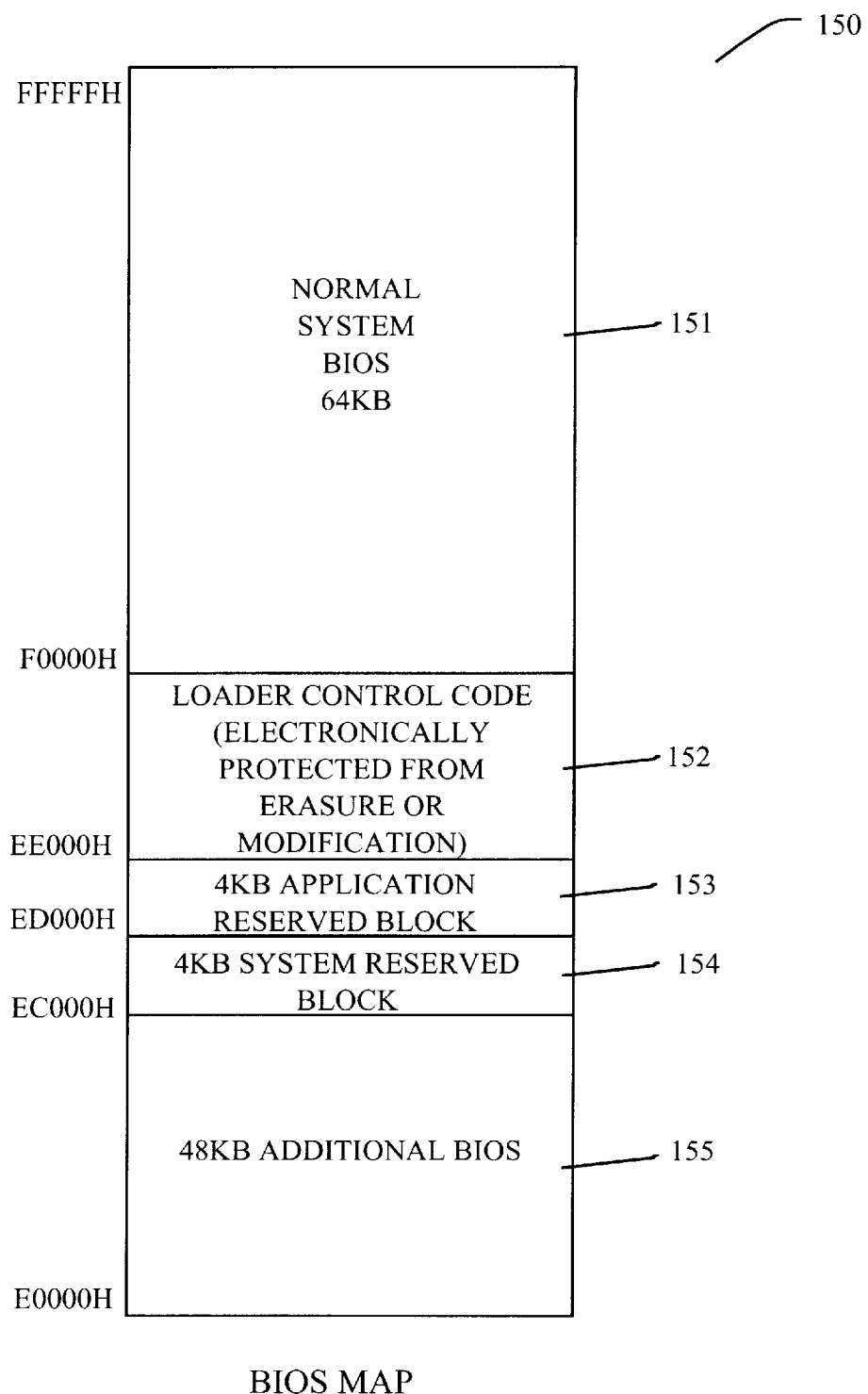
FIG. 1A is an illustration of the contents of the programmable non-volatile memory device.

Referring now to FIG. 1A, a memory map 150 of the contents of programmable non-volatile memory 134 is illustrated. The flash memory device used in the preferred embodiment contains four separately erasable/programmable non-symmetrical blocks of memory. One of these four blocks may be electronically locked to prevent erasure or modification of its contents once the device is installed. This configuration allows the processing logic of the present invention to program any other selected block of memory without affecting the contents of other blocks. As illustrated in FIG. 1A, five separately erasable/programmable non-symmetric blocks of the flash memory device of the preferred embodiment are illustrated. FIG. 1A depicts a memory region 151 containing a normal basic input/output system (BIOS) which is executed by controller 132 in unit 112. Processing logic within memory region 151 may be used to handle normal initialization and control functions of unit 112. Additional BIOS memory region 155 can be used to extend the BIOS memory area.

Electronically protected (i.e., locked) flash memory area 152 is an area for storage of a Loader Control Code module used for loading the contents of other memory regions of programmable non-volatile memory 134. The details of the operation of the Loader Control Code is illustrated in the flowcharts of FIGS. 2–9 and described in detail below.

Separately programmable area 153 is a memory area reserved for use by a particular application. This area may be used to customize the operation of unit 112 or to enhance the functionality of the system BIOS. Separately programmable area 154 is a memory area reserved for system use. This area may be an additional overflow area for normal system BIOS. With the exception of region 152, each of the other separately programmable memory regions of the flash memory may be modified, updated or reprogrammed using the invention described herein.

Referring again to FIG. 1, the apparatus illustrated in FIG. 1 represents a configuration between a host system 110 and a UNIT2BP 112 that may be housed in a single computer system, provided that a data link connects the host system 110 with the unit 112. Similarly, host system 110 may be coupled to unit 112 via a hardware cable or other data transfer medium. The present invention operates to allow host system 110 to control the update and reprogramming of a programmable non-volatile memory 134 residing in unit 112. Because the transfer of data must occur across data communications link 114, errors may be introduced between the data sent by host system 110 and the data received by unit 112 and programmable non-volatile memory 134. If such errors should occur and the contents of programmable non-volatile memory 134 is corrupted, the operation of unit 112 may be substantially impaired or completely disabled. It is therefore critical that updates or reprogramming of programmable non-volatile memory 134 occur with a guarantee that no errors to the contents of non-volatile memory 134 have been introduced. The presently used methods risk errors induced by transmission of data or program instructions across data communications link 114.

In the present invention, the data is sent in SDLC data packets to allow error checking to be applied to each block transmitted across data communications link 114. In the preferred embodiment, the SDLC packets may be sent as asynchronous or synchronous SDLC over the data communications link 114. In the following detailed description of the processing logic used in the present invention, the operation and control of the error free BIOS loader of the present invention is presented. In the following description, portions of the illustrated processing logic are performed by CPU 120 in host system 110 and other portions are performed by controller 132 in unit 112.

Figure 2:
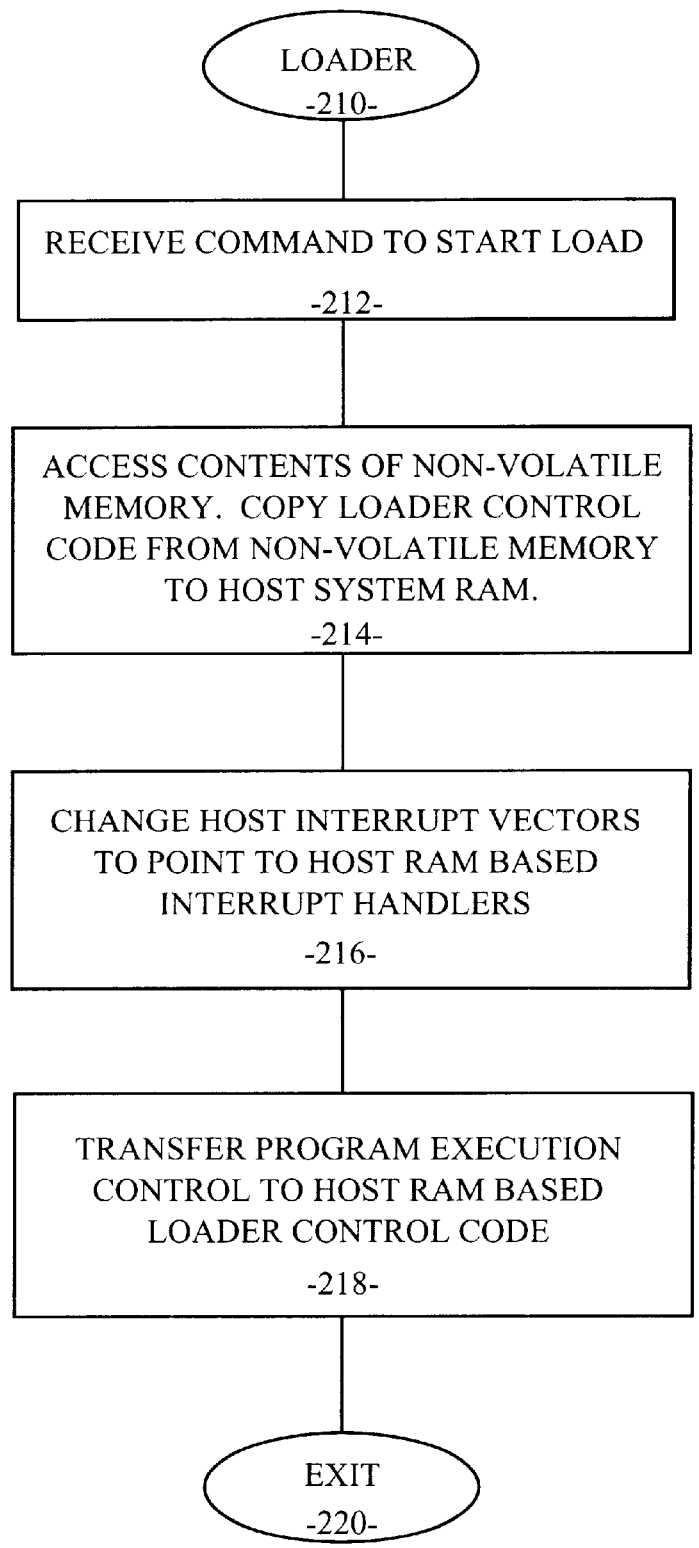
FIGS. 2–9 are flowcharts illustrating the processing logic of the present invention.

Referring now to FIG. 2, the loader processing logic of the present invention is illustrated starting at bubble 210. Processing logic executed by CPU 120 and host system 110 initiates the loader of the present invention after receiving a command to start the loading process in processing block 212. Once the load operation is initiated, CPU 120 issues a request to programmable non-volatile memory 134 in unit 112 for the contents of the Loader Control Code stored in region 152 of the programmable non-volatile memory 134. Because a particular unit to be programmed 112 may have specific loading requirements and procedures, host system 110 executes Loader Control Code retrieved from the unmodifiable portion of programmable non-volatile memory 134 of unit 112. The Loader Control Code is retrieved from non-volatile memory 134 and transferred to RAM 122 of host system 110 via link 114 in processing block 214. In preparation for executing the Loader Control Code now contained within RAM 122, host system 110 changes the host interrupt vectors to point to the host RAM based interrupt handlers corresponding to the now RAM 122 resident Loader Control Code (processing block 216). Program execution control is then transferred to the RAM based Loader Control Code in processing block 218.

Figure 3:
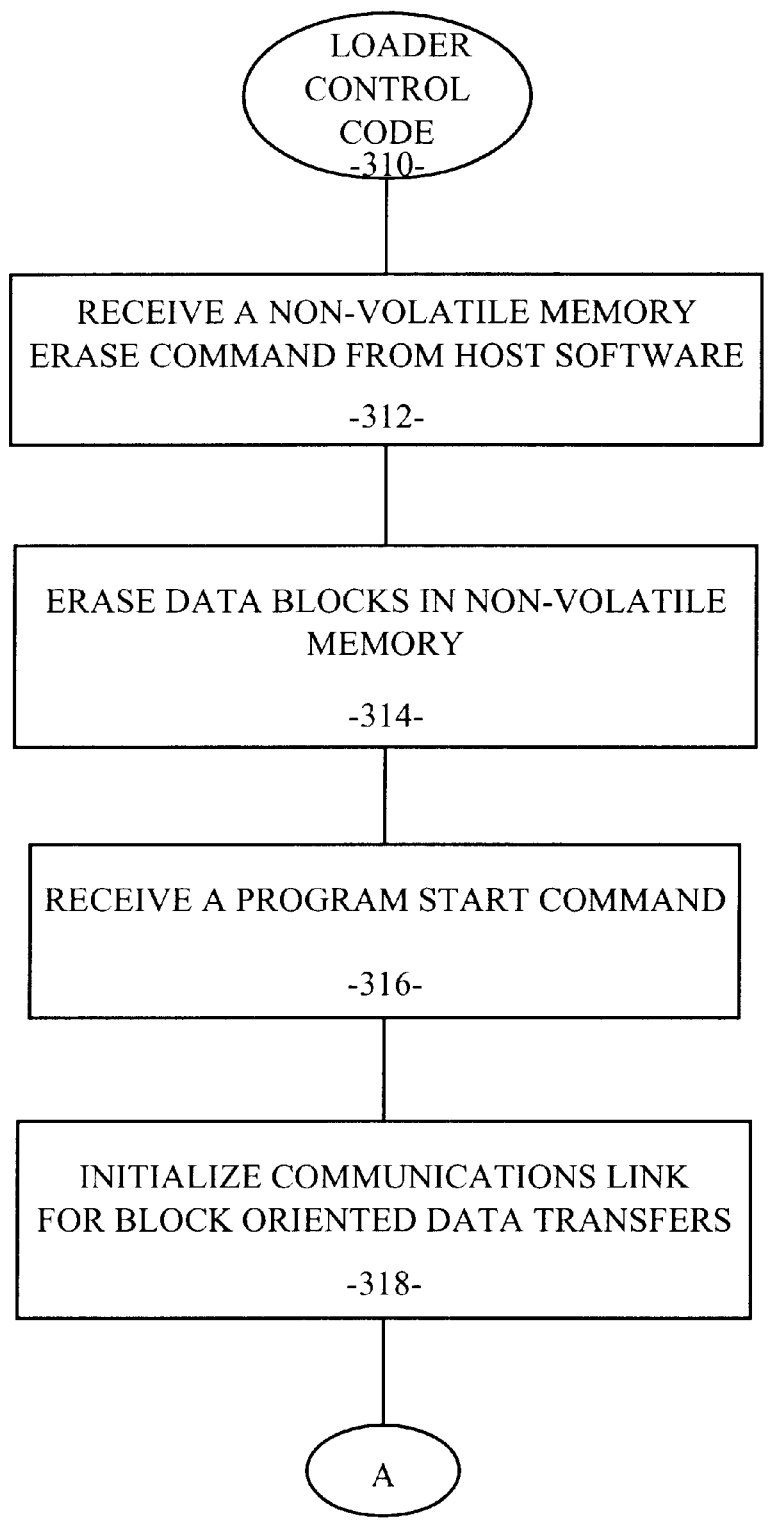

Referring now to FIG. 3, the first portion of the processing logic for the Loader Control Code is illustrated starting at bubble 310. Prior to beginning the loading process, the Loader Control Code waits for authorization from host system 110 software prior to beginning the loading of non-volatile memory 134. Using the newly configured interrupt vectors, the Loader Control Code receives a command to erase programmable non-volatile memory 134 from host software in processing block 312. On receipt of the erase command, host based Loader Control Code issues an erase request for the erasure of all or a portion of the data blocks in the programmable non-volatile memory 134. The erase request is issued from host system 110 across link 114 to data link interface 130. Either with or without the assistance of controller 132, data link interface 130 asserts well known signals on bus 136 to stimulate the erasure of data blocks in programmable non-volatile memory 134. Upon completion of the erase operation, RAM 122 based Loader Control Code waits for a program start command from host system 110 software. On receipt of a program start command in processing block 316, the data link interface 124 is initialized for communications in a block oriented data transfer mode. In the preferred embodiment, an SDLC block oriented data transfer mode is configured (processing block 318). The remainder of the operation of the Loader Control Code of the present invention is performed using SDLC block oriented data transfers. It will be apparent to one of ordinary skill in the art, however that block oriented data transfers other than SDLC type transfers may equivalently may be implemented using the techniques taught herein. Processing for the Loader Control Code then continues at the bubble labeled A illustrated in FIG. 4.

Figure 4:
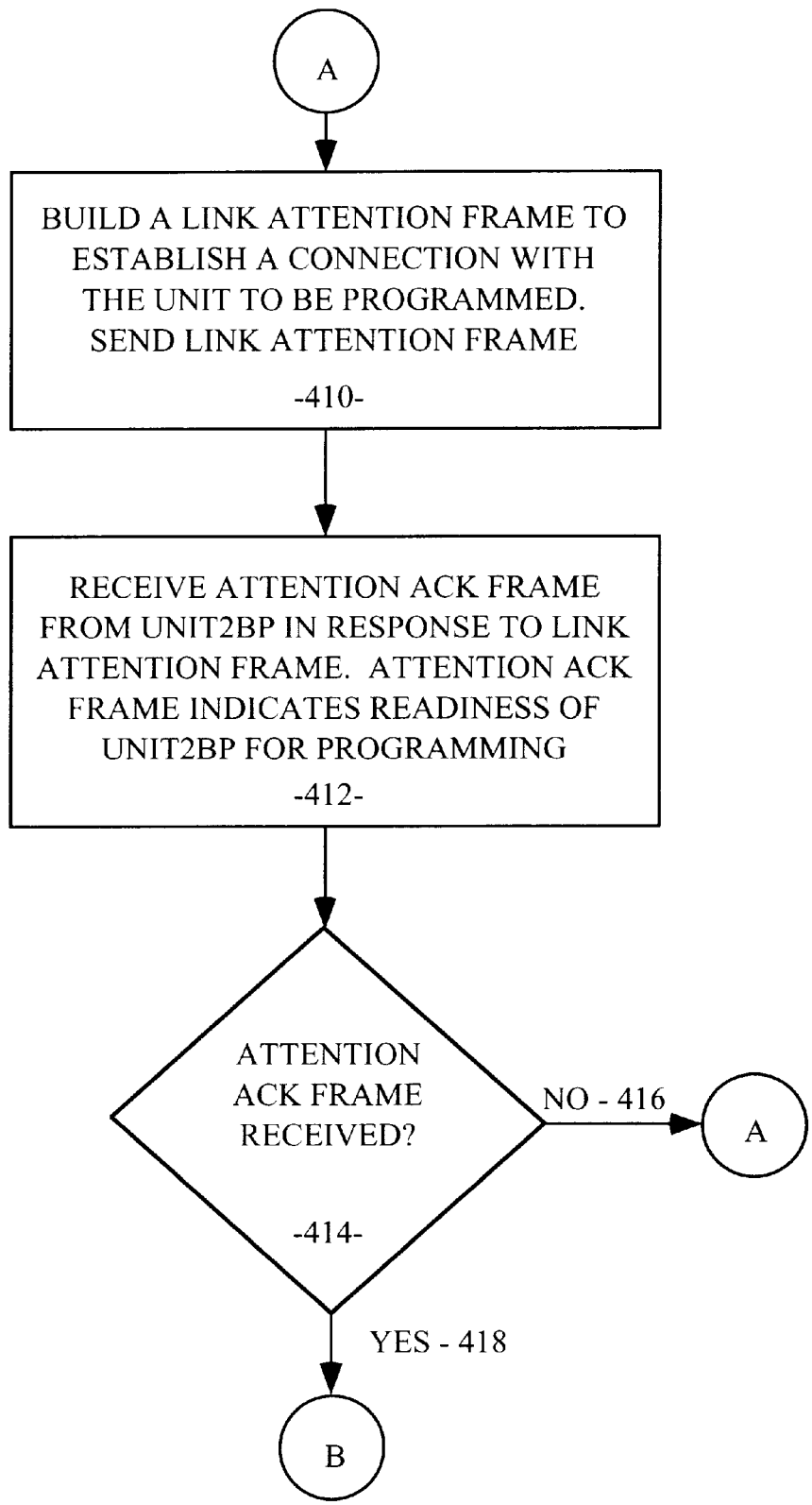

Referring now to FIG. 4, the processing logic for the Loader Control Code executing out of RAM 122 is illustrated starting at the bubble labeled A. The host system 110 Loader Control Code builds a link attention frame in processing block 410. In the following description, a frame is defined as a variable size information block comprising control and data information. The contents of each of the frames used in the preferred embodiment are illustrated in FIGS. 10 through 14. The link attention frame is used to establish a connection with the UNIT2BP 112.

Figure 10:
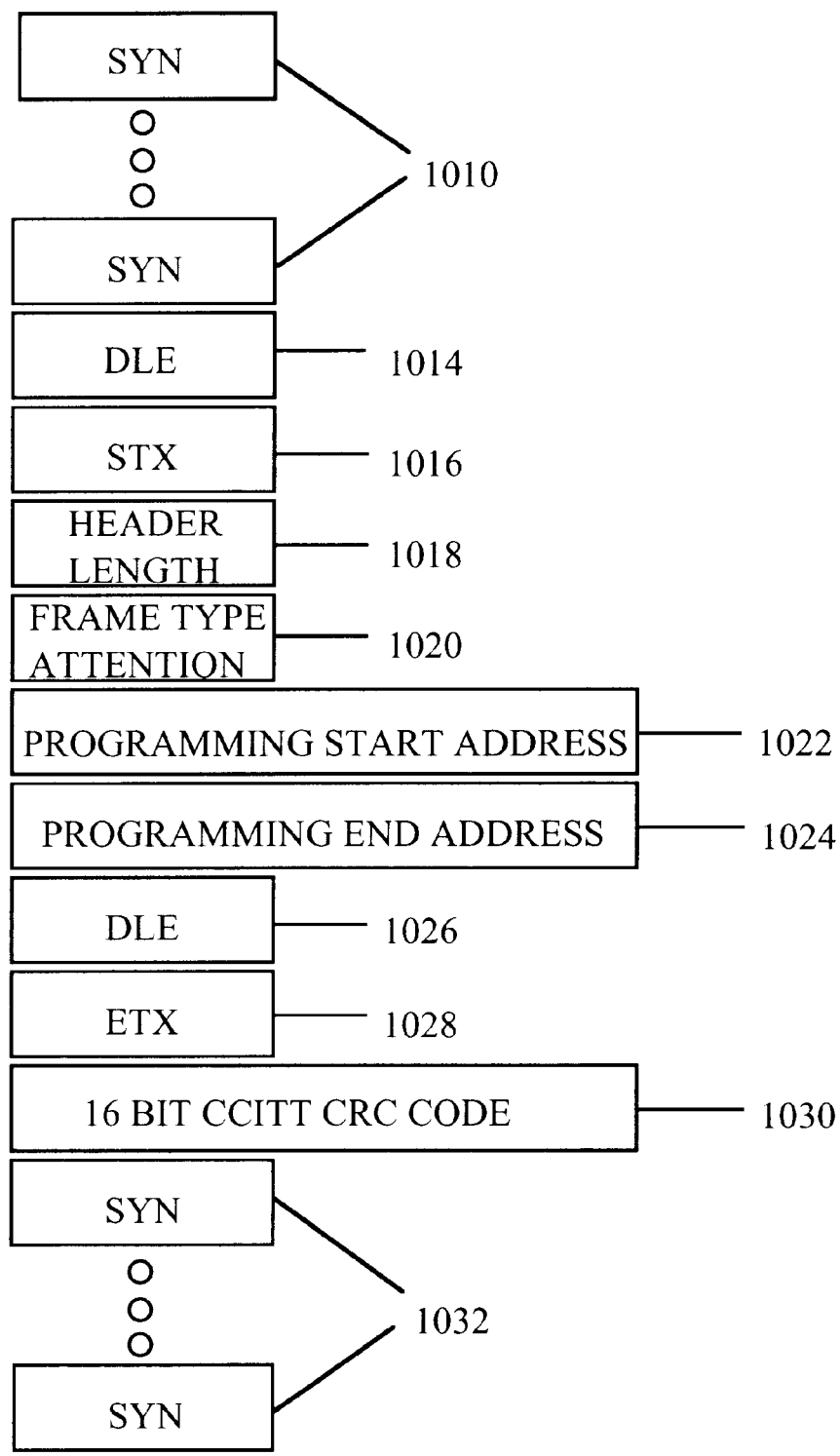
FIGS. 10–14 illustrate the contents of the various frames transferred across the data link in the present invention.

Referring now to FIG. 10, the contents of the link attention frame are illustrated. Each frame in the preferred embodiment is comprised of a set of control and data items, many of which are common throughout each of frames described herein. For example, the attention frame illustrated in FIG. 10 is comprised of a plurality of synchronization bytes 1010. The synchronization bytes are used to synchronize the transfer of the frame from host system 110 to unit 112. The DLE byte is a delimiting character included in the frame that identifies that the frame header is to follow. The STX byte is a start transmission code that specifies the start of the header field of the frame. The Header Length byte defines the number of header bytes to follow the Header Length byte. The frame type byte 1020 defines the type of frame using a unique coded identifier for each type of frame. In this case, frame type 1020 is set to an attention frame value that defines the frame as an attention frame. Programming start address 1022 and programming end address 1024 are 16 bit values in the preferred embodiment that define the address in programmable non-volatile memory 134 at which programming of the contents will be begin and end, respectively. The ETX byte is an end transmission code that specifies the end of the frame with the CRC code to follow. Using well known techniques, a cyclic redundancy check (CRC) value 1030 is computed and stored in the frame. The CRC code is an error detection code that allows errors in the contents of a block of memory to be detected. The CRC code 1030 is computed based on the contents of the remaining portions of the frame. Finally, the frame is terminated with additional synchronization bytes 1032.

Referring again to FIG. 4, the link attention frame is sent by CPU 120 from RAM 122 to controller 132 in unit 112. (Processing block 410). Controller 132 receives the link attention frame and responds by building an attention frame acknowledgment (ACK) frame in processing block 412. The attention ACK frame indicates the readiness of the unit to be programmed 112 for programming. The attention frame acknowledgment frame contents are illustrated in FIG. 11.

Figure 11:
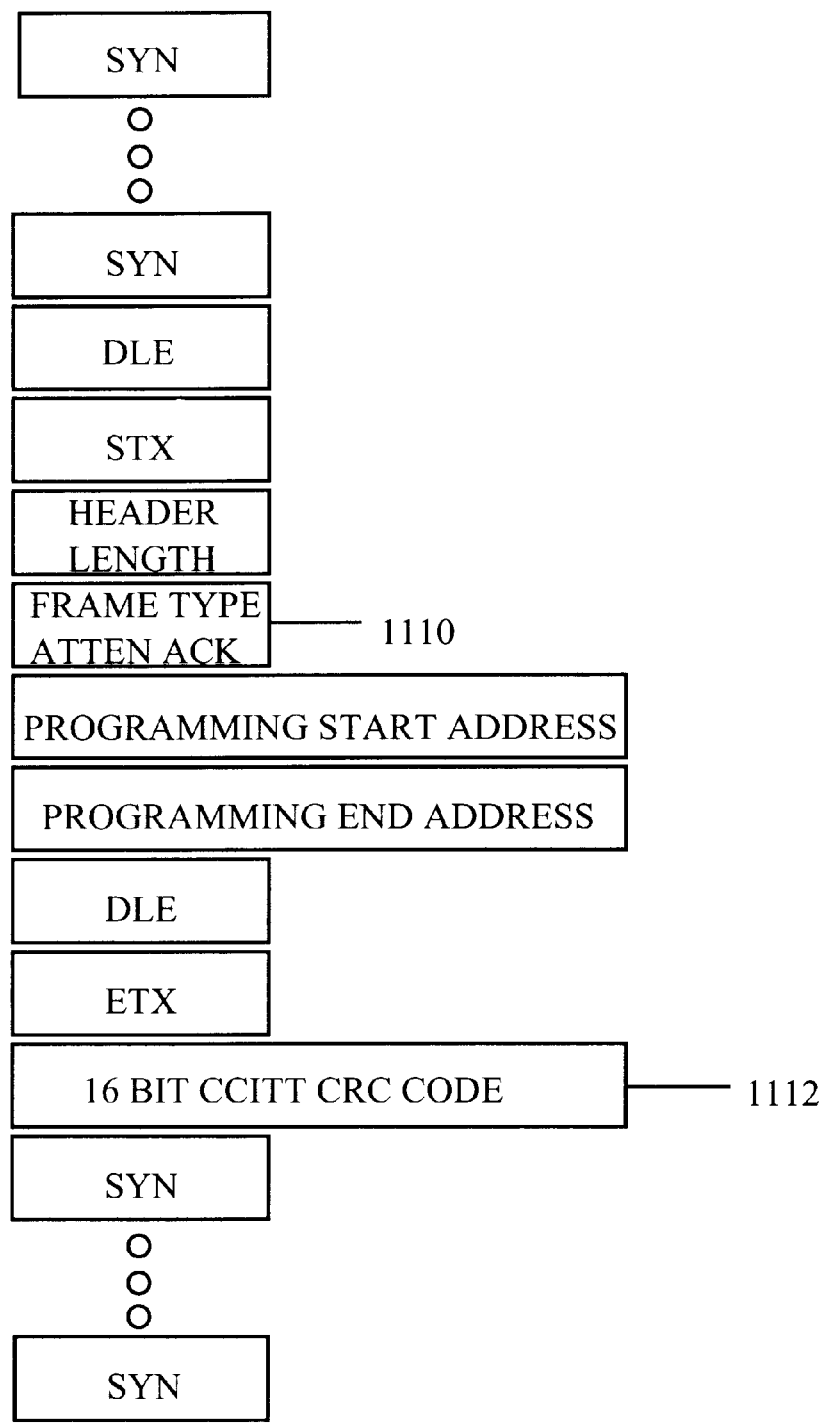

Referring now to FIG. 11, the attention acknowledgment frame contents are illustrated. In a manner similar to the frame illustrated in FIG. 10 and described above, the attention acknowledgment frame illustrated in FIG. 11 includes many of the same header and trailer bytes as present in most of the frames used in the preferred embodiment of the present invention. Specifically, the synchronization (SYN) bytes, the DLE byte, the STX byte and the HEADER LENGTH byte are all similar to that described in FIG. 10. The frame type 1110 is set to a unique value indicating a attention acknowledgment frame type. The programming start address and programming end address are the same values received in the link attention frame sent by host system 110. Controller 132 computes a CRC code for the attention frame and stores the CRC code in byte 1112. The attention acknowledgment frame is then sent by controller 132 to CPU 120 via data communications link 114. On receipt of the attention acknowledgment frame, CPU 120 computes the CRC code for the received frame. If the computed CRC code matches the CRC code stored in the attention acknowledgment frame CRC code byte 1012, the attention acknowledgment frame is considered successfully received. If successfully received, processing path 418 is taken to the bubble labeled B illustrated in FIG. 5. If however, the attention acknowledgment frame is not received or received in error, processing path 416 is taken to the bubble labeled A illustrated in FIG. 4 where a new link attention frame is built and sent to unit 112 in an attempt to establish or reestablish a connection between host system 110 and unit 112.

Figure 5:
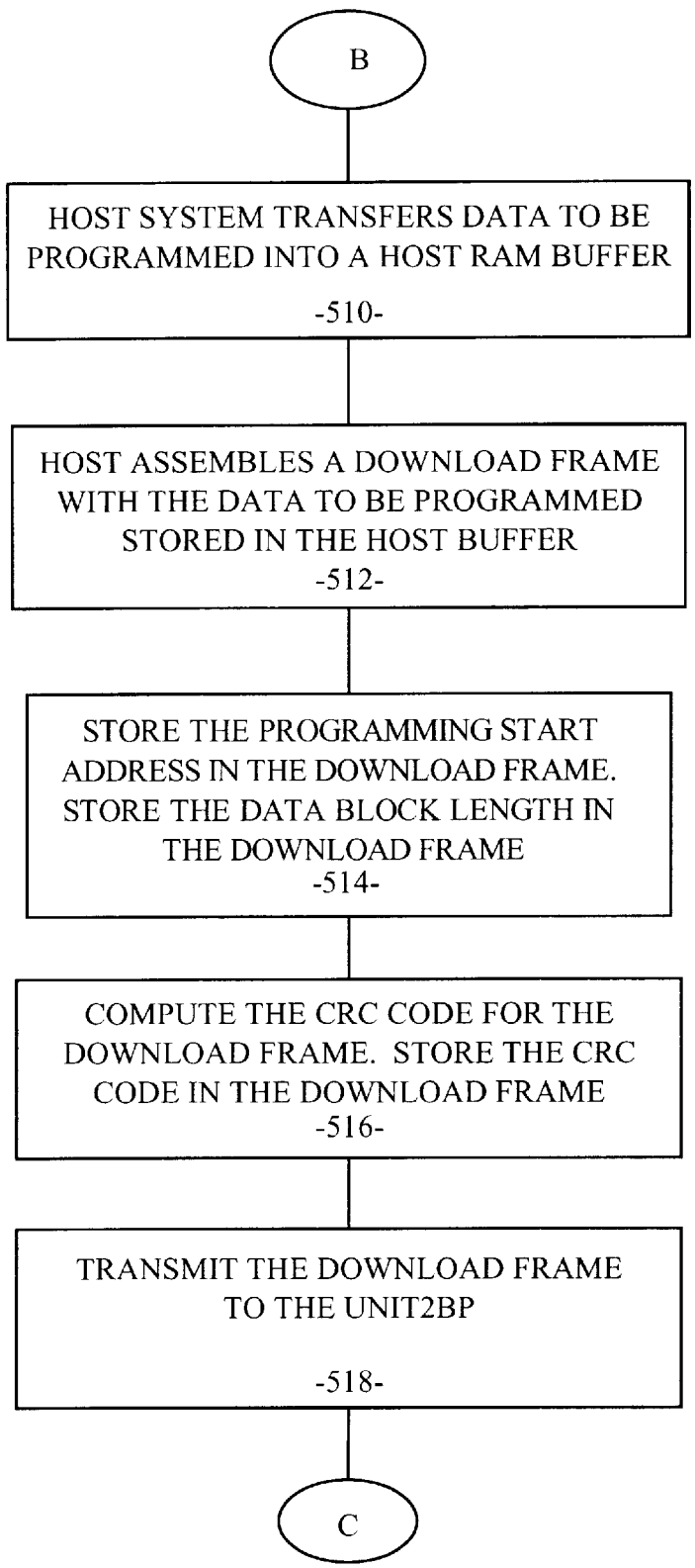
Figure 12:
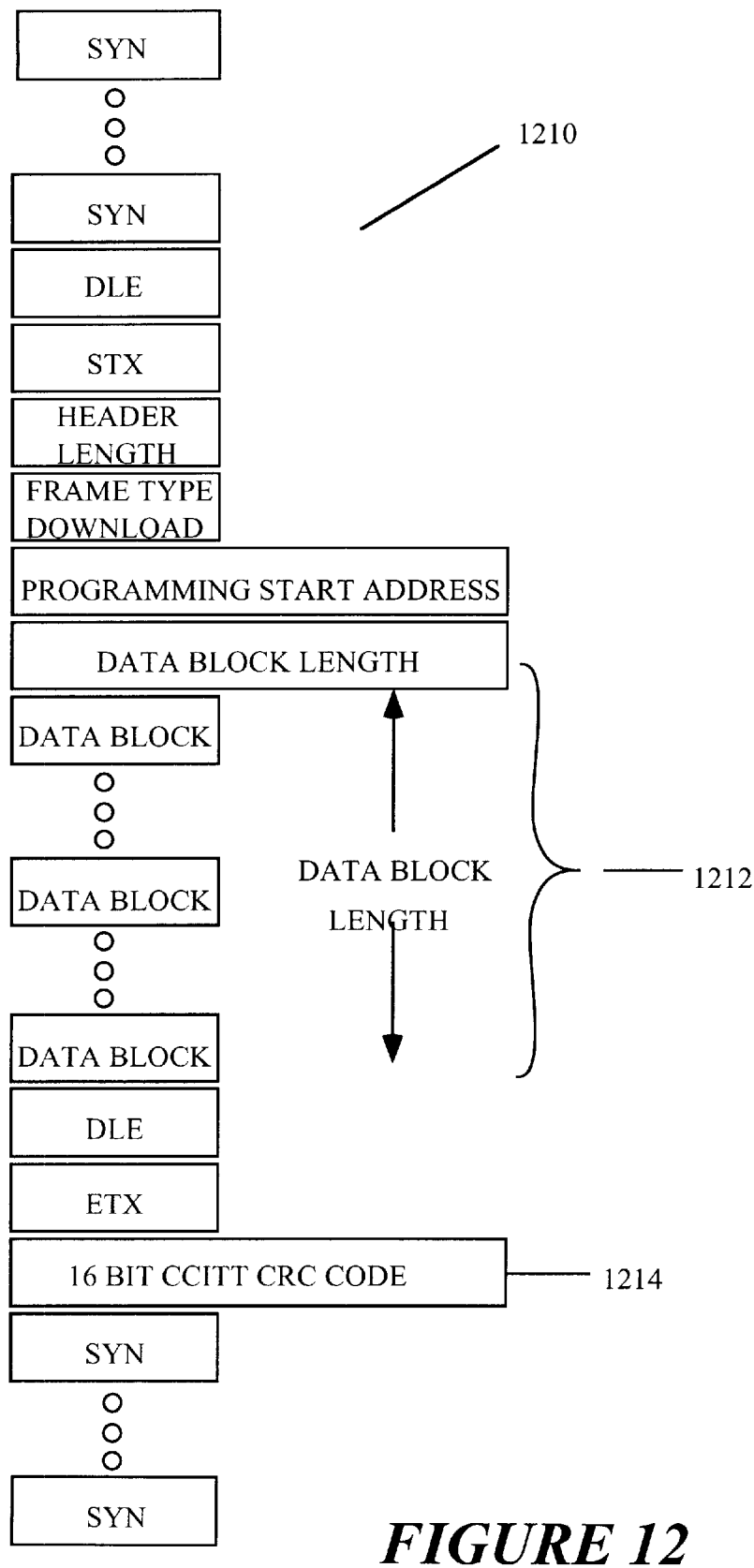

Referring now to FIG. 5, processing for the Loader Control Code processing logic continues at the bubble labeled B. CPU 120 loads data and instructions to be programmed into programmable non-volatile memory 134 into a temporary local transfer buffer in RAM 122. (Processing block 510). The data and instructions loaded into the temporary RAM 122 buffer represent a BIOS image to be programmed into programmable non-volatile memory 134. It will be apparent to those of ordinary skill in the art, however, that the data and instructions transferred and programmed into programmable non-volatile memory 134 can be any arbitrary set of data items or processing instructions. CPU 120 uses the programmed data residing in the temporary buffer to assemble a download frame (i.e., data frame) for transfer to unit 112. The download frame is assembled in RAM 122 of host system 110. The contents of the download frame is illustrated in FIG. 12. The download frame illustrated in FIG. 12 comprises a standard frame header, a frame type of download, a programming start address that defines the start address in programmable non-volatile memory 134 at which the data in the download will be loaded. The download frame also includes a data block length and a plurality of data blocks 1212. The data block length defines the number of data blocks to follow. Each data block provides a byte of storage for instructions or data to be loaded into corresponding locations in programmable non-volatile memory 134. In the preferred embodiment, the number of data blocks in a download frame can be any arbitrary length as defined by the data block length. The download frame also includes a CRC code 1214 that represents the CRC code based on the contents of the remaining portions of the download frame.

Referring again to FIG. 5, the programming start address is stored in the download frame in processing block 514. The data block length and the data blocks 1212 are loaded with the data to be programmed as residing in RAM 122. The CRC code for the download frame is computed and stored in CRC code location 1214 of the download frame in processing block 516. The download frame is transmitted by CPU 120 to controller 132 via data communications link 114 in processing block 518. Processing for the Loader Control Code continues at the bubble labeled C illustrated in FIG. 6.

Figure 6:
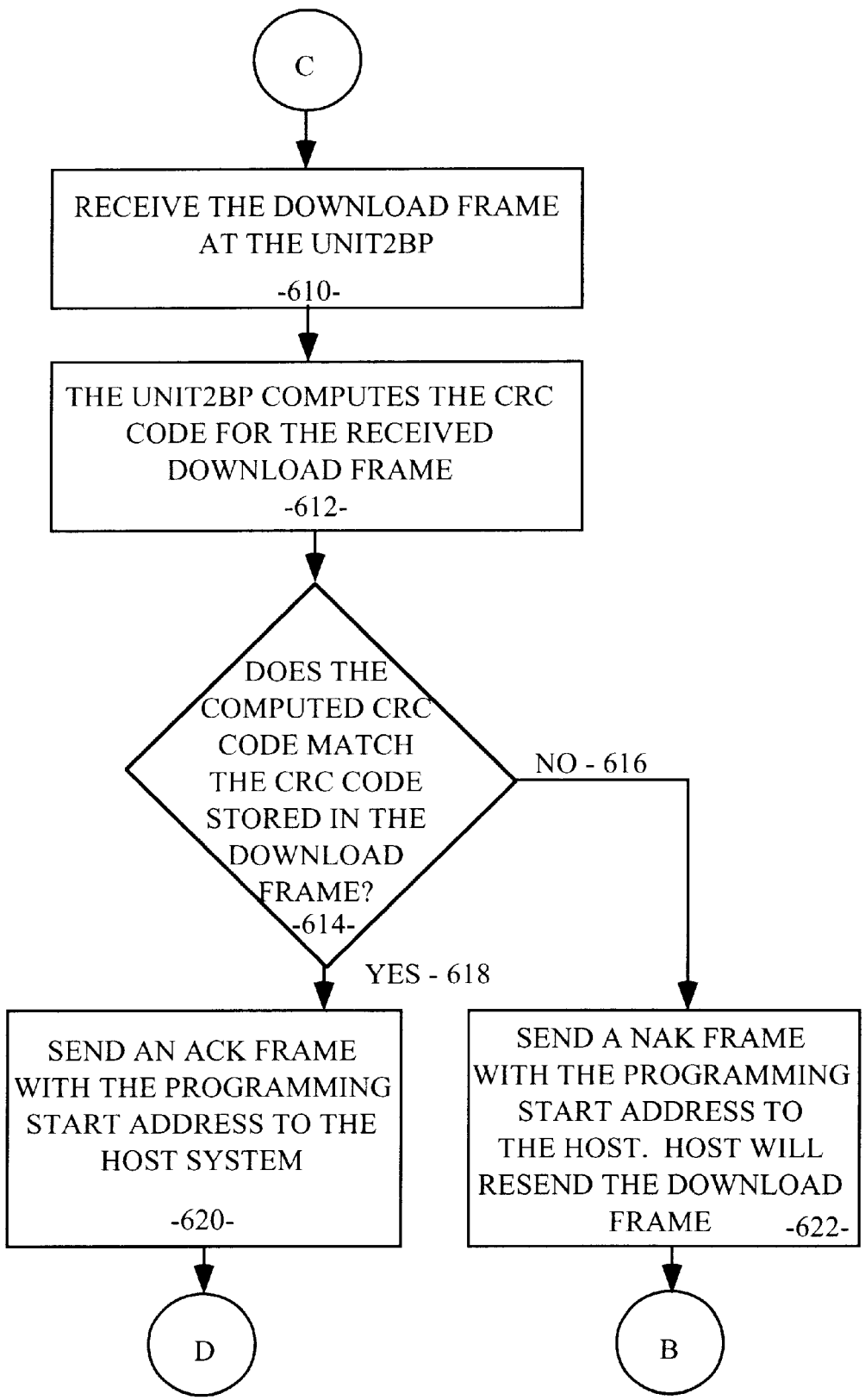

Referring now to FIG. 6, the processing logic for the Loader Control Code continues at the bubble labeled C. Controller 132 of unit 112 receives the download frame in processing block 1610. Controller 132 computes the CRC code for the received download frame in processing block 612. If the computed CRC code matches the CRC code 1214 stored in the download frame received by controller 132, processing path 618 is taken to processing block 620. If however, the computed CRC code does not match the CRC code stored in the download frame, processing path 616 is taken to processing block 622. For a successful CRC comparison, an acknowledgment (ACK) frame is assembled by controller 132 in response to the previously received download frame. The programming start address is stored in the ACK frame to identify the particular download frame being acknowledged. Processing for the successfully acknowledged download frame then continues at the bubble labeled D illustrated in FIG. 7.

Figure 13:
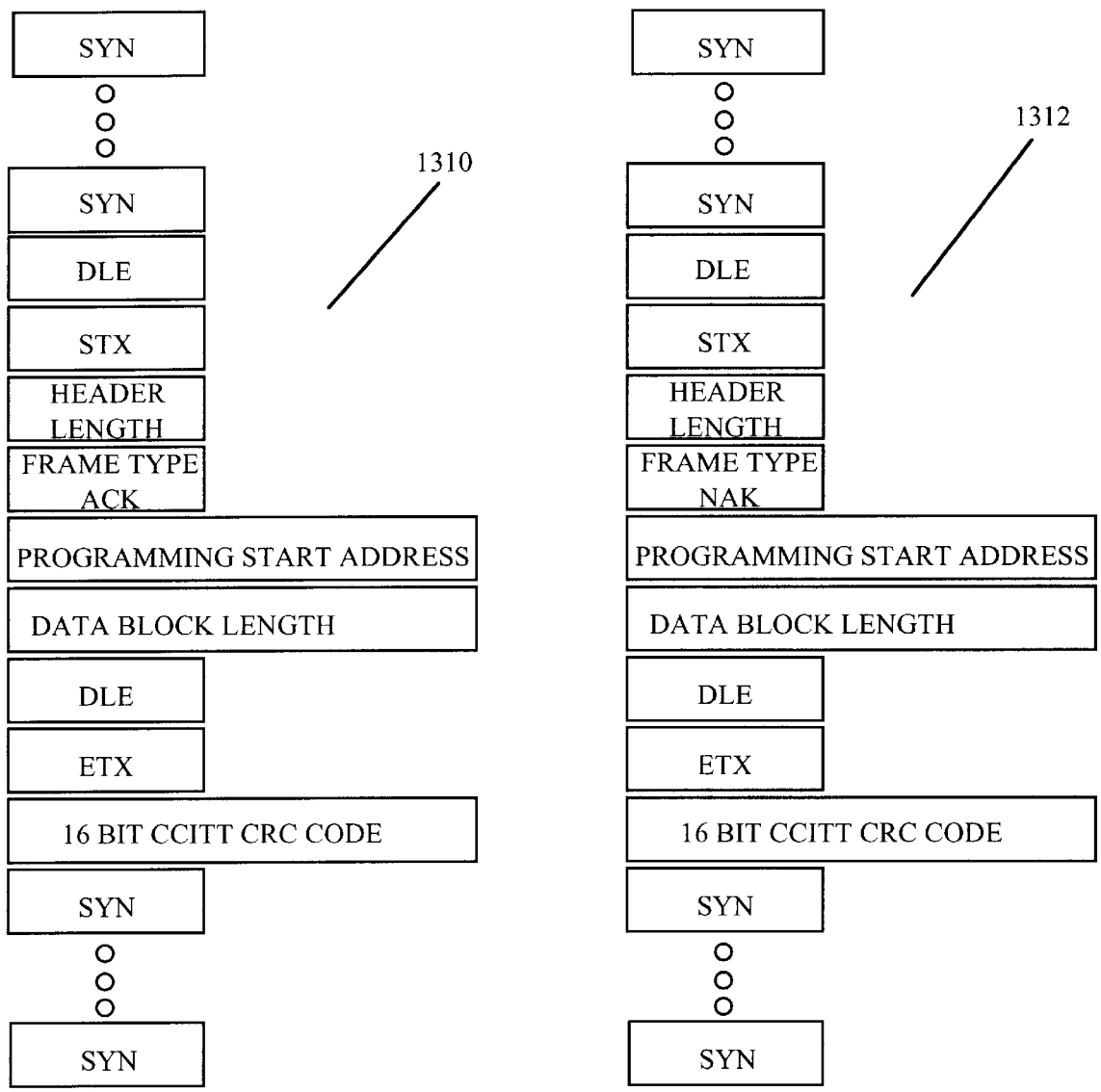

For a download frame received in error, processing block 622 is executed and a negative acknowledgment (NAK) frame is assembled in response to errant download frame. The programming start address is loaded into the NAK frame to identify the corresponding download frame. Processing then continues at the bubble labeled B illustrated in FIG. 5 where the host system 110 resends the download frame previously received in error. The ACK frame contents 1310 and NAK frame contents 1312 are illustrated in FIG. 13.

Figure 7:
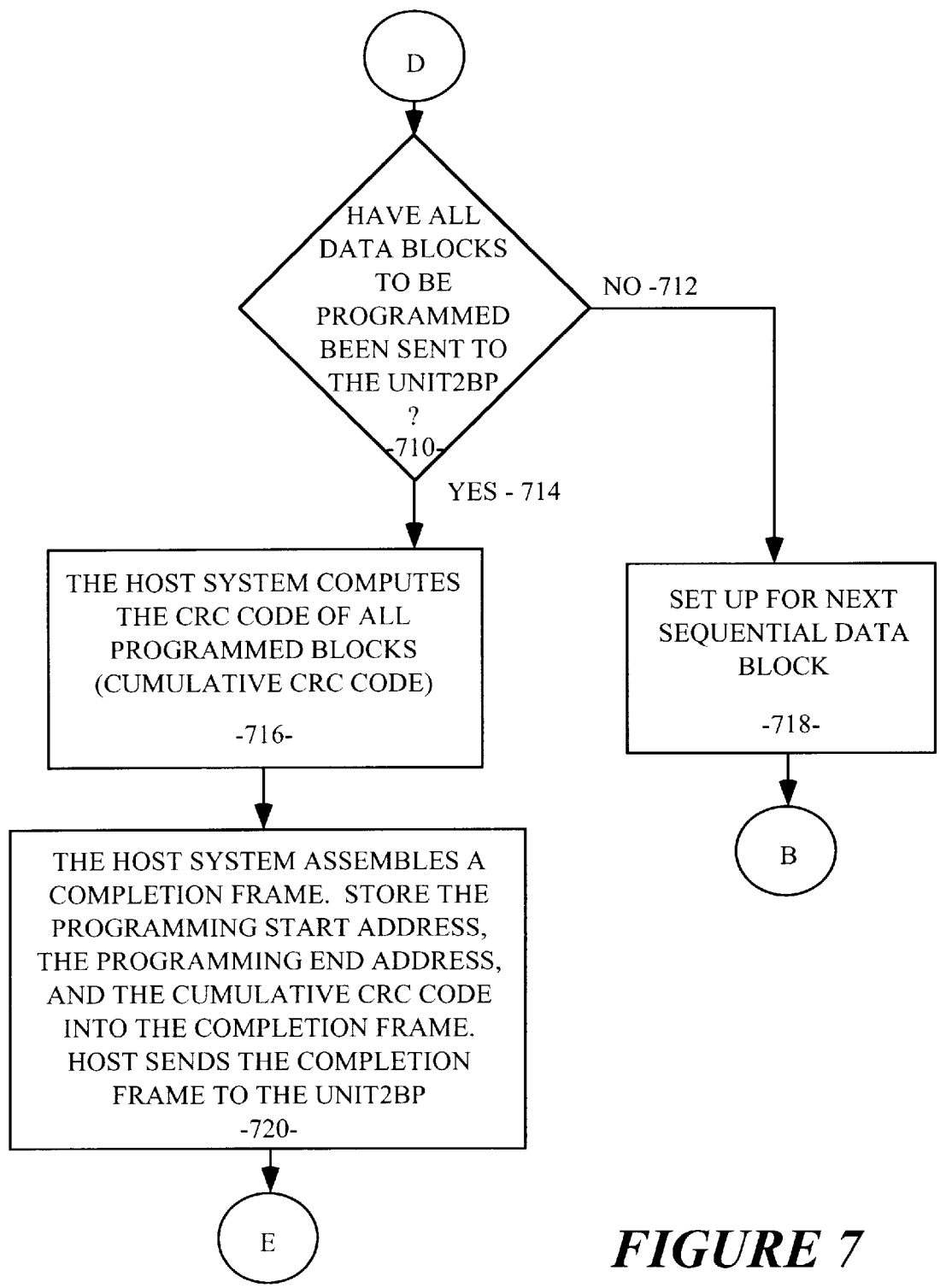

Referring now to FIG. 7, the processing for a successfully received download frame continues at the bubble labeled D. If all of the blocks of programmable non-volatile memory 134 to be programmed have been loaded, processing path 714 is taken to processing block 716. If blocks of programmable non-volatile memory 134 still have not been programmed, processing path 712 is taken to processing block 718 where the host system 110 sets up for the next sequential block of data for transfer to unit 112. Processing then continues for transfer of the next sequential data block through the bubble labeled B illustrated in FIG. 5.

Figure 14:
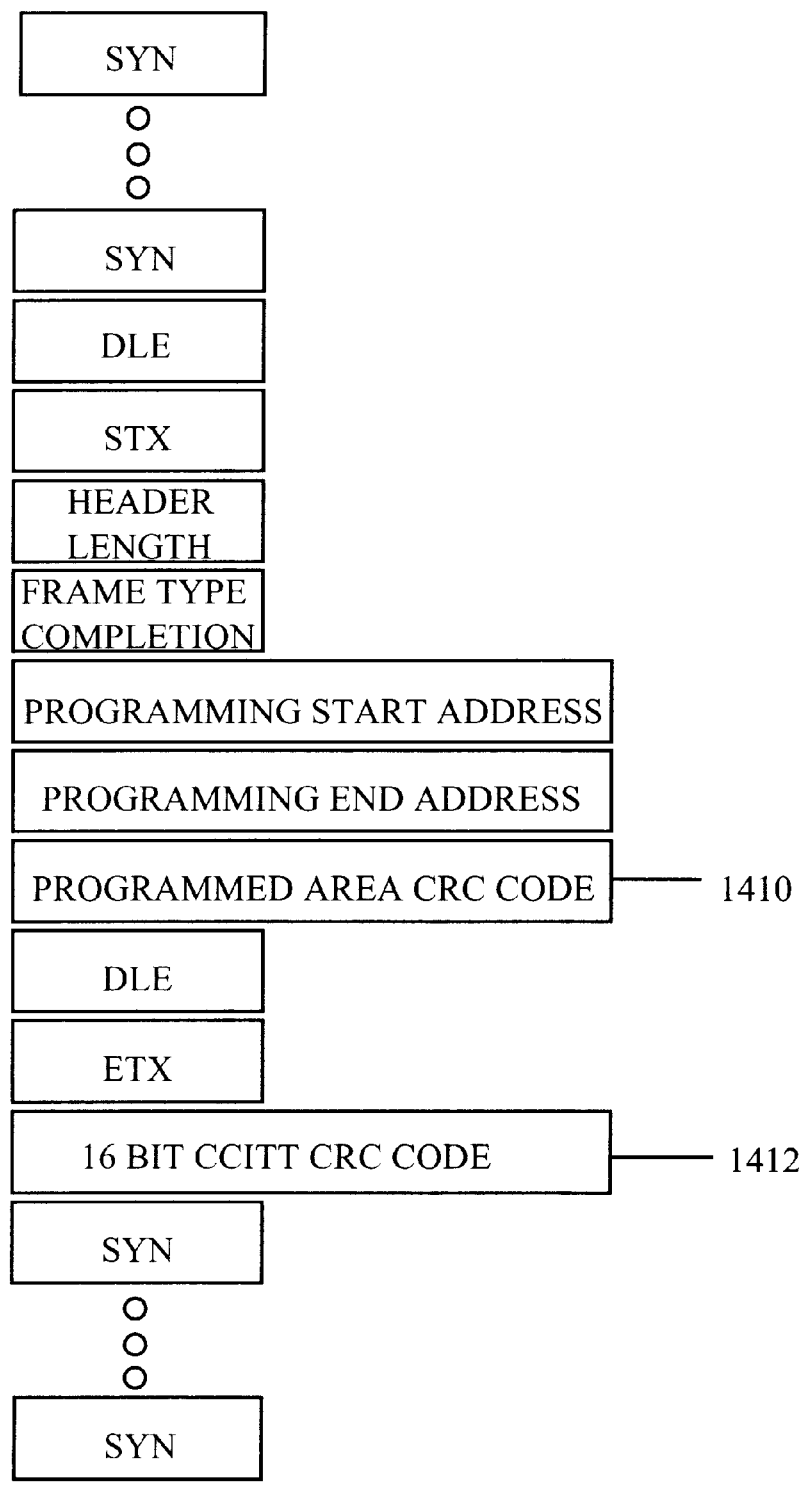

If all data blocks to be programmed have been sent to unit 112, the host system 110 computes the CRC code of all programmed blocks that were sent to unit 112 via link 114 during the download process. The CRC code of all programmed blocks is denoted the cumulative CRC code or cumulative error detection code. (Processing block 716). Next, host system 110 assembles a completion frame. The contents of a completion frame are illustrated in FIG. 14. The programming start address, the programming end address, and the cumulative CRC code computed by host system 110 is stored in the completion frame in processing block 720. Host system 110 then transfers the completion frame to unit 112 via link 114 in processing block 720. Processing then continues at the bubble labeled E illustrated in FIG. 8.

Figure 8:
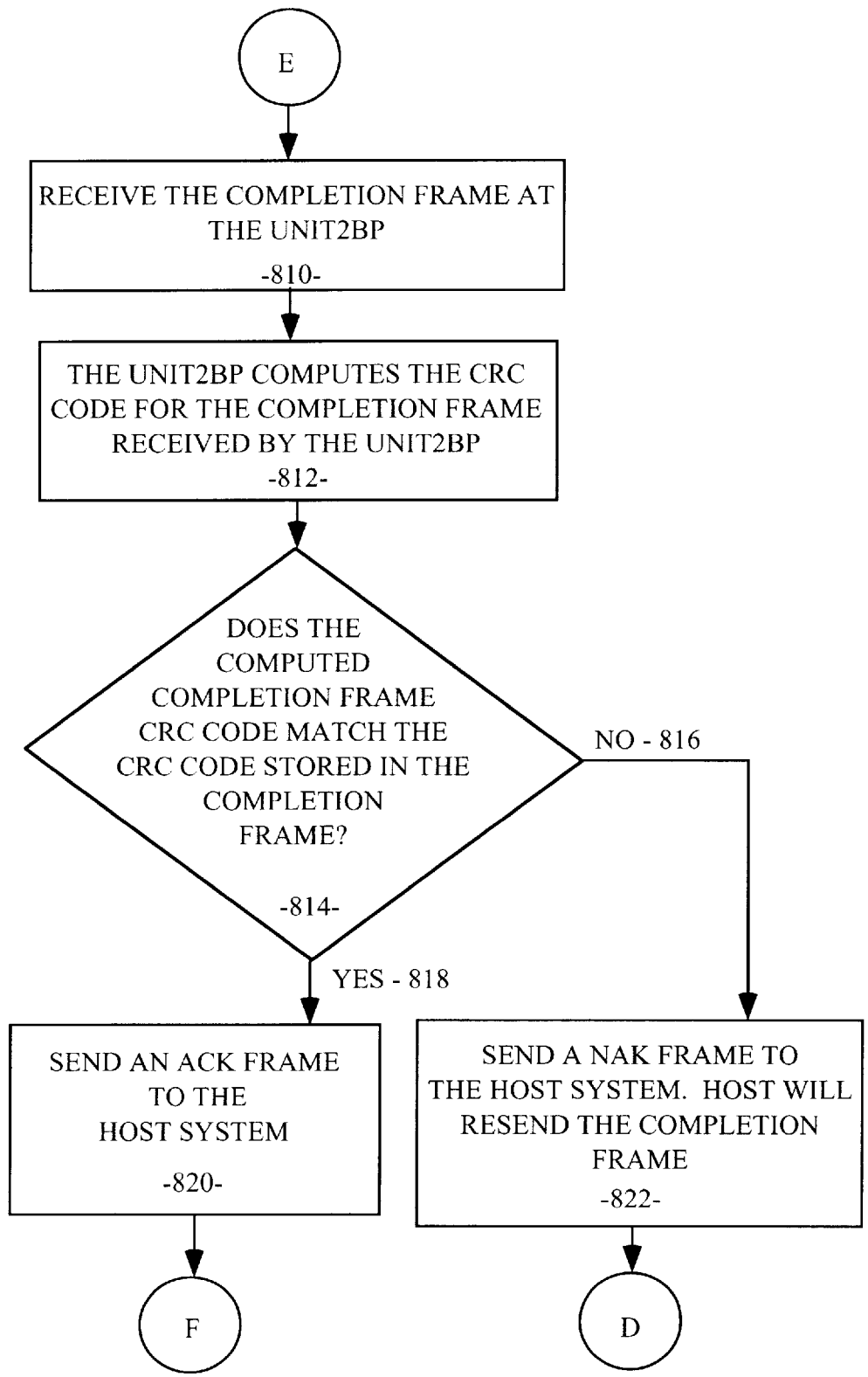

Referring now to FIG. 8, processing performed by the controller 132 of unit 112 for the Loader Control Code processing is illustrated. At processing block 810, the completion frame transferred by host system 110 is received by controller 132. The controller 132 computes the CRC code for the received completion frame in processing block 812. If the computed CRC code matches the CRC code stored in the completion frame, processing path 818 is taken to processing block 820. If, however, the computed CRC code does not match the CRC code stored in the completion frame, processing path 816 is taken to processing block 822. For a successfully matched completion frame CRC code, and ACK frame is sent to the host system 110 in processing block 820. The contents of the ACK frame are illustrated in FIG. 13. Processing then continues at the bubble labeled F illustrated in FIG. 9. For an unsuccessfully matched completion frame CRC code, a NAK frame is sent to the host system 110 in processing block 822. In this case, the host system 110 will resend the completion frame. Processing then continues at the bubble labeled D where another completion frame is assembled and sent to unit 112. The contents of the NAK frame are illustrated in FIG. 13.

Figure 9:
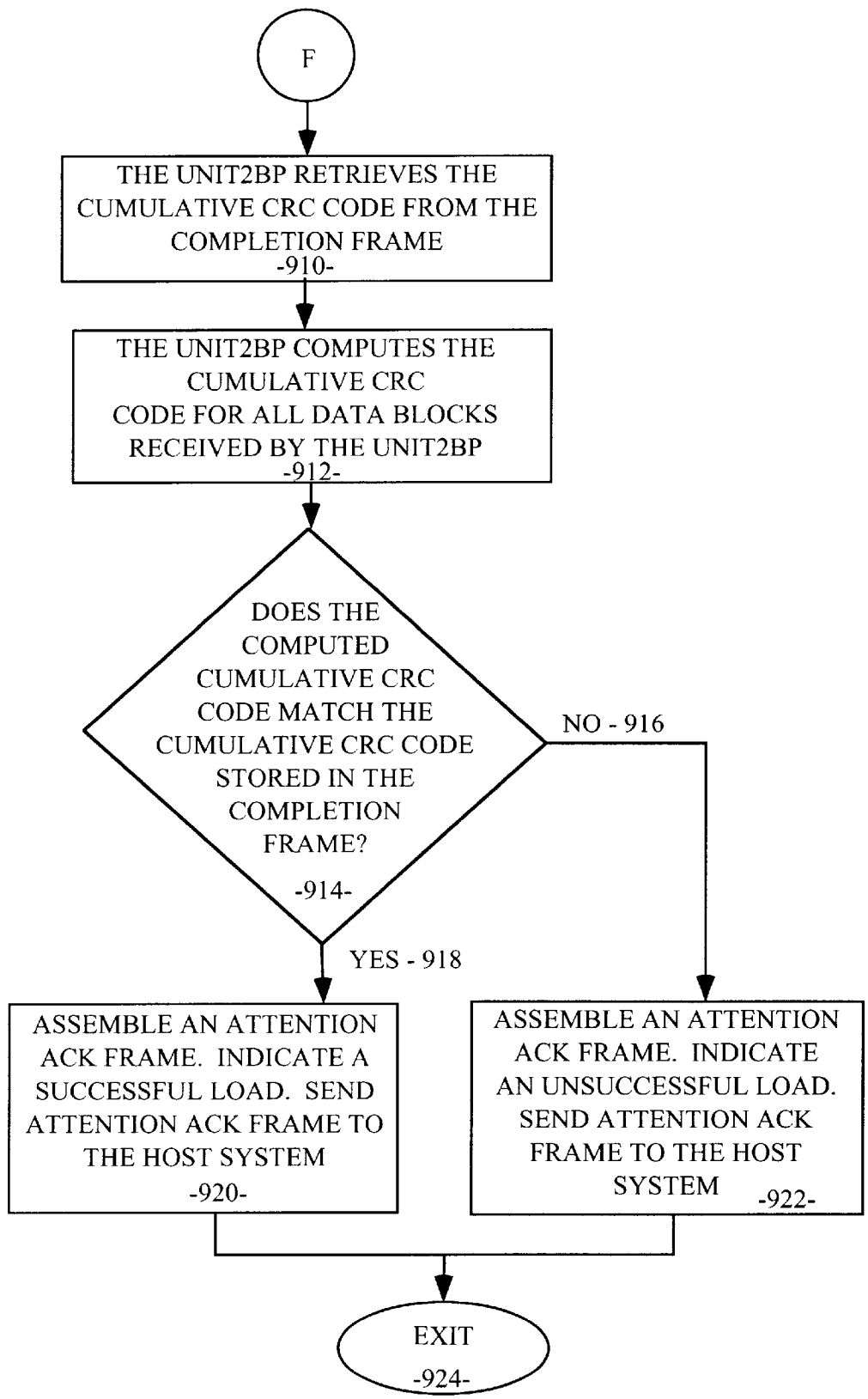

Referring now to FIG. 9, the processing performed by controller 132 on the successful receipt of a completion frame is illustrated. Controller 132 retrieves the cumulative CRC code 1410 as illustrated in FIG. 14 from the completion frame received from host system 110 (processing block 910). Next, controller 132 accesses programmable non-volatile memory 134 to compute the cumulative CRC code for all data blocks programmed by host system 110 (processing block 912). If the cumulative CRC code computed by controller 132 matches the cumulative CRC code 1412 stored in the completion frame, processing path 918 is taken to processing block 920. If, however, the cumulative CRC code computed by controller 132 does not match cumulative CRC code 1412 stored in the completion frame, processing path 916 is taken to processing block 922. For a successfully matched CRC code, the successful programming of programmable non-volatile memory 134 has been validated. In this case, an attention ACK frame is assembled by controller 132 to notify host system 110 of the successful download procedure. The contents of the attention ACK frame are illustrated in FIG. 11. Once the attention ACK frame is sent to host system 110 (processing block 920), processing for the load control code of the present invention terminates at exit bubble 924. If the cumulative CRC code does not match, an error has occurred in the download of non-volatile memory of 134. In this case, an attention ACK frame is assembled by controller 132 with an indication that an unsuccessful load has been detected. An indication of an unsuccessful load procedure may be indicated by storing a special predetermined value in programming start address or programming end address portions of the attention ACK frame. The attention ACK frame indicating the unsuccessful load is then sent to host system 110 in processing block 922. At the option of host system 110, the entire download procedure of programmable non-volatile memory 134 may be retried. Processing for the load control code of the present invention then terminates through exit bubble 924.

Thus, a computer system and method is described for loading a non-volatile memory device over a serial or parallel data link while assuring an error free load.

Although, the present invention has been described herein with reference to a specific embodiment, main modifications and variations therein will readily occur to those of ordinary skill in the art. Accordingly, all such variations and modifications are included within the intended scope of the present invention as defined by the following claims.

We claim:

1. An apparatus for communicating a predetermined quantity of programming data from a host processing system over a data link to a peripheral unit having a controller and a programmable non-volatile memory coupled to said controller, said apparatus comprising:

means in said host system for subdividing said predetermined quantity of programming data into download frames, each download frame containing at least a portion of said predetermined quantity of programming data and having a first error detection code attached thereto that is based on the contents of the download frame to which said first error detection code is attached;

means in said host system for building a completion frame containing a first cumulative error detection code based on all of said predetermined quantity of programming data communicated to said peripheral unit;

means in said host system for communicating said download frame and said completion frame over said data link to said peripheral unit; and means in said peripheral unit for determining a second error detection code based on the contents of said download frame as received by said peripheral unit;

means in said peripheral unit for storing the contents of said download frame in said non-volatile memory if a successful transfer thereof across said data link is indicated by a comparison of said first error detection code and said second error detection code; and means in said peripheral unit for determining a second cumulative error detection code based on the contents of said plurality of download frames as received by said peripheral unit via said data link, and means in said peripheral unit for determining if the communication of said predetermined quantity of programming data over said data link to said peripheral unit was completed successfully by comparing said first cumulative error detection code received in said completion frame with said second cumulative error detection code.

2. An apparatus as claimed in claim 1, wherein said programmable non-volatile memory is a flash memory.

3. An apparatus as claimed in claim 1 wherein said programmable non-volatile memory device is partitioned into a plurality of separately erasable and programmable partitions, including a first partition storing loader control code and a second partition storing said predetermined quantity of programming data and wherein said first partition is electronically protected from erasure or modification of its contents once said peripheral unit is installed.

4. An apparatus as claimed in claim 3 wherein said host includes means for retrieving said loader control code from said first partition of said non-volatile memory through said data link, and means for executing said loader control code.

5. The apparatus as claimed in claim 1 wherein said peripheral unit further includes means for sending an acknowledgement frame to said host processing system via said data link for each download frame received by said peripheral unit.

6. In a system comprising a peripheral unit having a controller and programmable non-volatile memory storing programming data for execution by said controller, and a host system coupled to said peripheral unit by a data link, a method of configuring said peripheral unit by supplying a predetermined amount of programming data to said non-volatile memory, error free, over said data link, said method comprising the steps of:

building a download frame in said host processor, said download frame containing a portion of said predetermined amount of programming data for said controller and a first error detection code calculated from said download frame;

transferring said download frame over said data link to said peripheral unit;

computing a second error detection code for said received download frame by said controller;

comparing said first and second error detection codes;

storing said programming data in said programmable non-volatile memory if said first error decoction code matches said second error detection code;

building a completion frame in said host processor, said completion frame containing a first cumulative error detection code based on all download frames built to be transmitted across said data link and containing any of said predetermined amount of programming;

transferring said completion frame via said data link to said peripheral unit;

computing a second cumulative error detection code based on all download frames received across said data link from said host and containing any of said predetermined amount of programming;

determining if said error-free programming of said non-volatile memory over said data link was completed successfully by comparing said first cumulative error detection code received in said completion frame with said second cumulative detection code.

7. The method as claimed in claim 6 wherein said programmable non-volatile memory is a flash memory.

8. The method as claimed in claim 6 further including the steps of:

partitioning said programmable non-volatile memory device into a plurality of separately erasable and programmable partitions, including a first partition storing loader control code and a second partition storing said programming data and wherein said first partition is electronically protected from erasure or modification of its contents once said peripheral unit is installed.

9. The method as claimed in claim 8 further including the step of erasing said second partition prior to storing said programming data therein.

10. The method as claimed in claim 8 further including the step of uploading said Loader Control code from said first partition to said host processor via said data link prior to building a download frame.

11. The method as claimed in claim 6 wherein said programming data comprises a basic input/output system for said controller.

12. In a system comprising a peripheral unit having a controller and a programmable flash memory device having a first non-alterable partition storing loader control code and a second partition storing programming data for execution by the controller, and a host system memory storing a BIOS image to be loaded into said second partition, said host system being coupled to said peripheral unit by a data link, a method of transferring said BIOS image over said data link to said flash memory, said method comprising the steps of:

uploading said loader control code from said first partition to said host processor via said data link;

erasing said second partition of said flash memory device;

building a download frame in said host processor, said download frame containing portions of said BIOS image and a first CRC code based on the contents of the remaining portions of said download frame;

transferring said download frame via said data link so as to be received by said peripheral unit;

determining a second CRC code based on the contents of said remaining portions of said download frame as received by said unit over said data link;

comparing said first CRC code with said second CRC code;

sending an acknowledgement frame from said peripheral unit to said host system for each download frame received by said peripheral unit;

storing said portions of said BIOS image in said programmable flash memory device if a successful transfer across said data link is indicated by a comparison between said first CRC code and said second CRC code;

after all of said BIOS image has been sent to said peripheral unit, building a completion frame in said host system, said completion frame containing a first cumulative CRC code based on the entire BIOS image transferred from said host system to said peripheral device;

transferring said completion frame via said data link to said peripheral unit;

computing a second cumulative CRC code based on said entire BIOS image as received by said peripheral unit via said data link; and determining if said error-free programming of said flash memory device over said data link was completed successfully by comparing said first cumulative error detection code received in said completion frame with said second cumulative detection code.

13. An apparatus comprising;

processing logic in a host system to subdivide a predetermined quantity of programming data into download frames, each download frame containing at least a portion of said predetermined quantity of programming data and associated with a first error detection code, the first error detection code based on the contents of the associated download frame;

processing logic in said host system for building a completion frame including a first cumulative error detection code based on all download frames; and a data link interface in said host system to communicate said download frames and said completion frame over a data link to a processing logic in a peripheral unit, the processing logic in the peripheral unit to determine a second error detection code based on the contents of at least one download frame and to save the contents of the at least one download frame in a nonvolatile memory when a comparison of the first error detection code and the second error detection code indicates a successful transfer occurred;

processing logic in said peripheral unit for determining a second cumulative error detection code based on the contents of all of said download frames as received by said peripheral unit via said data link; and processing logic in said peripheral unit for comparing said first cumulative error detection code received in said completion frame with said second cumulative error detection code.

14. An apparatus as claimed in claim 13, wherein said non-volatile memory is a flash memory.

15. An apparatus as claimed in claim 13 wherein said non-volatile memory device is partitioned into a plurality of separately erasable and programmable partitions, including a first partition storing loader control code and a second partition storing said predetermined quantity of programming data and wherein said first partition is electronically protected from erasure or modification of its contents once said peripheral unit is installed.

16. An apparatus as claimed in claim 15, wherein said host includes means for retrieving said loader control code from said first partition of said non-volatile memory through said data link, and processing logic for executing said loader control code.

17. The apparatus as claimed in claim 13, wherein said peripheral unit further includes processing logic for sending an acknowledgement frame to said host processing system via said data link for each download frame received by said peripheral unit.

18. An apparatus comprising:

a peripheral unit connected to a data link;

processing logic in said peripheral unit to determine a second error detection code based on the contents of a download frame as received by said peripheral unit, said download frame including at least a portion of a predetermined quantity of programming data and a first error detection code based on the contents of said download frame as sent;

processing logic in said peripheral unit to store the programming data of said download frame in a non-volatile memory when a successful transfer across said data link is indicated by a comparison of said first error detection code and said second error detection code;

processing logic in said peripheral unit to determine a second cumulative error detection code based on the contents of all download frames received by said peripheral unit via said data link; and processing logic in said peripheral unit to compare a first cumulative error detection code received in a completion frame with said second cumulative error detection code.

19. An apparatus as claimed in claim 18, wherein said non-volatile memory is a flash memory.

20. An apparatus as claimed in claim 18 wherein said programmable non-volatile memory device is partitioned into a plurality of separately erasable and programmable partitions, including a first partition storing loader control code and a second partition storing said predetermined quantity of programming data and wherein said first partition is electronically protected from erasure or modification of its contents once said peripheral unit is installed.

21. The apparatus as claimed in claim 20, wherein said peripheral unit further includes means for sending an acknowledgement frame to said host processing system via said data link for each download frame received by said peripheral unit.

22. An apparatus as claimed in claim 20, wherein said host includes means for retrieving said loader control code from said first partition of said non-volatile memory through said data link, and processing logic for executing said loader control code.

23. A method comprising the steps of:

transferring a download frame over a data link to a peripheral unit, said download frame containing a portion of a predetermined amount of programming data for a controller in said peripheral unit and a first error detection code calculated from said download frame;

storing said programming data in a non-volatile memory in said peripheral unit if said first error detection code matches a second error detection code computed for said received download frame by said controller;

transferring a completion frame via said data link to said peripheral unit, said completion frame containing a first cumulative error detection code based on all download frames transmitted across said data link;

comparing said first cumulative error detection code received in said completion frame with a second cumulative detection code based on all download frames received across said data link from said host.

24. The method as claimed in claim 23 wherein said programmable non-volatile memory is a flash memory.

25. The method as claimed in claim 23 further including the steps of:

partitioning said non-volatile memory device into a plurality of separately erasable and programmable partitions, including a first partition storing loader control code and a second partition storing said programming data and wherein said first partition is electronically protected from erasure or modification of its contents once said peripheral unit is installed.

26. The method as claimed in claim 25 further including the step of erasing said second partition prior to storing said programming data therein.

27. The method as claimed in claim 23 wherein said programming data comprises a basic input/output system for said controller.

* * * * *